United States Patent [19]

Merritt

[11] 4,075,072
[45] Feb. 21, 1978

[54] LASER CHEMISTRY SYNTHESIS OF NF$_4$BF$_4$

[75] Inventor: James A. Merritt, Pulaski, Tenn.

[73] Assignee: The United States of America as represented by the Secretary of the Army, Washington, D.C.

[21] Appl. No.: 770,156

[22] Filed: Feb. 18, 1977

[51] Int. Cl.$^2$ .............................................. B01J 1/10
[52] U.S. Cl. ..................... 204/157.1 R; 204/DIG. 11
[58] Field of Search ................. 204/157.1 R, DIG. 11

[56] References Cited
FOREIGN PATENT DOCUMENTS
690,681  7/1964  Canada ........................ 204/DIG. 11

Primary Examiner—Howard S. Williams
Attorney, Agent, or Firm—Nathan Edelberg; Robert P. Gibson; James T. Deaton

[57] ABSTRACT

A process for producing the product NF$_4$BF$_4$ by subjecting gases NF$_3$, BF$_3$, and a gaseous source of a compound which releases fluorine gas when subjected to a tuned CO$_2$ laser source to cause the product NF$_4$BF$_4$ to precipitate and be collectable. This product can be produced in a closed chamber system or in a continuous flow system at room temperature.

7 Claims, No Drawings

LASER CHEMISTRY SYNTHESIS OF NF₄BF₄

DEDICATORY CLAUSE

The invention described herein may be manufactured, used, and licensed by or for the Government for governmental purposes without the payment to me of any royalties thereon.

BACKGROUND OF THE INVENTION

In the past, the product $NF_4BF_4$ has been produced through a photolysis reaction of $NF_3$, $BF_3$ and fluorine gas ($F_2$) using Hg-lamp and reacting at liquid nitrogen temperature. This is not a preferred way of producing the desired product due to the temperatures required for causing the reaction to take place and due to the cast of producing the product. In the prior art, the reaction is much more costly than is desirable.

Therefore, it is an object of this invention to provide a more economical way for producing $NF_4BF_4$.

Another object of this invention is to produce a more economical process for producing $NF_4BF_4$ by reacting chemicals at room temperature and using infrared photons which cost much less than the photons produced from Hg-lamp.

Still another object of this invention is to provide a process in which cryogenic temperatures are not required for producing the desired product.

A still further object of this invention is to provide a chemical process for producing $NF_4BF_4$ in which less corrosive chemicals are used.

SUMMARY OF THE INVENTION

In accordance with this invention, the gases $NF_3$, $BF_3$ and a gaseous source of a compound which releases fluorine gas when subjected to a tuned $CO_2$ laser at room temperature are reacted to produce the reaction product $NF_4BF_4$ as a precipitate and a gaseous byproduct.

DESCRIPTION OF THE PREFERRED EMBODIMENTS

Synthesis of the reaction product $NF_4BF_4$ is accomplished in accordance with this invention by placing the gases $NF_3$, $BF_3$, and $SF_6$ in a reaction chamber in a molar ratio of each of the gases in a 1:1 mole ratio or with an excess mole ratio of the $SF_6$ gas. The reaction is carried out at room temperature of about 25° C ± 5° C. Also, in order to cause the reaction to go, pulsed $CO_2$ laser radiation tuned to the $P_{14} - P_{20}$ lines is used to irradiate the gases in an appropriate reaction chamber. The reaction product ($NF_4BF_4$) precipitates out and gaseous $SF_4$ is pumped off in a conventional manner. A schematic illustration of the reaction is illustrated in the blocks hereinbelow:

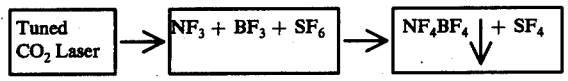

Another way of producing the reaction product $NF_4BF_4$ is by placing gases $NF_3$, $BF_3$ and $N_2F_4$ in an appropriate reaction vessel with the gases being present in a 1:1 mole ratio or with an excess mole ratio of the $N_2F_4$ gas. The gases are subjected to pulsed $CO_2$ laser radiation tuned to the $P_{14} - P_{20}$ lines to irradiate the bases in the reaction vessel. The reaction product $NF_4BF_4$ precipitates out and the other reaction product $N_2F_3$ is pumped off in a conventional manner. This reaction proceeds in accordance with the general formula illustrated hereinbelow:

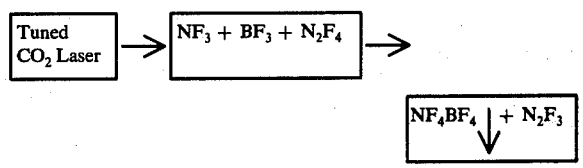

An appropriate reaction vessel for either of the reactions above can comprise a simple cylindrical gas cell of about 1 inch by 4 inches with salt windows on either end through which the laser radiation is injected. Also, this reaction can be carried out in a continuous flow system by continuously exposing the reaction gases to pulsed $CO_2$ laser radiation to produce pound quantities of the reaction product $NF_4BF_4$. The reaction product $NF_4BF_4$ is a product that is used as a fluorine fuel for the HF chemical laser.

EXAMPLE 20 torr each of the gases $NF_3$, $BF_3$, and $SF_6$ were placed in a stainless steel reaction chamber of a simple cylindrical gas cell one inch by four inches with salt windows on either end. Pulsed $CO_2$ radiation tuned to the $P_{14} - P_{20}$ lines was used to radiate the cell through one of the salt windows. The reaction was carried out at room temperature as set forth hereinabove and the reaction product ($NF_4BF_4$) precipitated out in the cell and gaseous $SF_4$ which was the other reaction product was pumped off in a conventional manner. In this reaction, an excess of more than one molar ratio of $SF_6$ can be used. The criticality being that at least one mole ratio of $SF_6$ be used in order to efficiently produce the reaction product $NF_4BF_4$.

I claim:

1. A process for producing $NF_4BF_4$ comprising placing the gases $NF_3$, $BF_3$ and a gaseous compound that gives up fluorine when subjected to laser energy in a reaction container at room temperature and subjecting the gases to a $CO_2$ laser source for irradiating the reaction chamber and producing $NF_4BF_4$ as a precipitate.

2. A process for producing $NF_4BF_4$ as set forth in claim 1, wherein said gaseous compound that gives up free fluorine is $SF_6$, wherein said $CO_2$ laser source is tuned to the $P_{14} - P_{20}$ lines, and wherein said room temperature is about 25° C ± 5° C.

3. A process for producing $NF_4BF_4$ as set forth in claim 2, wherein said gases are continuously passed through a flow system and said $CO_2$ laser source is pulsed to produce substantial quantities of the product $NF_4BF_4$.

4. A process for producing $NF_4BF_4$ as set forth in claim 1, wherein said gaseous compound that gives up free fluorine is $N_2F_4$, wherein said $CO_2$ radiation is tuned to the $P_{14} - P_{20}$ lines, and wherein said room temperature is about 25° C ± 5° C.

5. A process for producing $NF_4BF_4$ as set forth in claim 4, wherein said gases continuously flow through a flow system and said $CO_2$ laser source is pulsed to produce substantial quantities of the product $NF_4BF_4$.

6. A process for producing $NF_4BF_4$ as set forth in claim 3, wherein said gases are present in an amount of about 1 mole ratio each.

7. A process for producing $NF_4BF_4$ as set forth in claim 5, wherein said gases are present in an amount of about 1 mole ratio each.